US012356142B2

(12) United States Patent
Scheek et al.

(10) Patent No.: US 12,356,142 B2
(45) Date of Patent: *Jul. 8, 2025

(54) LOW PROFILE LOUDSPEAKER DEVICE

(71) Applicant: Mayht Holding B.V., Goleta, CA (US)

(72) Inventors: Mattias Jeffrey Scheek, Amsterdam (NL); Timothy Ruben Scheek, Rotterdam (NL)

(73) Assignee: Mayht Holding B.V., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,181

(22) Filed: Jul. 31, 2024

(65) Prior Publication Data

US 2025/0024194 A1 Jan. 16, 2025

Related U.S. Application Data

(60) Continuation of application No. 18/321,301, filed on May 22, 2023, now abandoned, which is a (Continued)

(30) Foreign Application Priority Data

Nov. 1, 2017 (NL) ..................................... 1042617

(51) Int. Cl.
*H04R 1/28* (2006.01)
*H04R 7/04* (2006.01)
(Continued)

(52) U.S. Cl.
CPC ............. *H04R 1/2873* (2013.01); *H04R 7/04* (2013.01); *H04R 7/18* (2013.01); *H04R 9/04* (2013.01);
(Continued)

(58) Field of Classification Search
None
See application file for complete search history.

(56) References Cited

U.S. PATENT DOCUMENTS 4,191,863 A * 3/1980 Matsuda ................ H04R 9/063 381/431
8,416,971 B1 * 4/2013 Salehi ...................... H04R 9/04 381/396
(Continued)

FOREIGN PATENT DOCUMENTS

JP 2010114833 A 5/2010
WO 2014091598 A1 6/2014

OTHER PUBLICATIONS

Notice of Allowance dated Jun. 28, 2024; Korean Application No. 10-2023-7020669.

*Primary Examiner* — Walter F Briney, III
(74) *Attorney, Agent, or Firm* — Fortem IP LLP

(57) ABSTRACT

A loudspeaker device includes first and second diaphragms arranged co-axially in an opposed relation to each other and having a rear volume in-between, each diaphragm having a plurality of motors operatively coupled thereto, and a frame having first and second ends, and first and second rims provided at the first and second ends, respectively. The motors of the first and second diaphragms are arranged in the same plane, and the motors are provided on the frame around the periphery of the first and second diaphragms.

13 Claims, 5 Drawing Sheets

Related U.S. Application Data continuation of application No. 17/681,914, filed on Feb. 28, 2022, now Pat. No. 12,041,412, which is a division of application No. 16/760,049, filed as application No. PCT/EP2018/079509 on Oct. 26, 2018, now Pat. No. 11,297,415.

(51) Int. Cl.
*H04R 7/18* (2006.01)
*H04R 9/04* (2006.01)
*H04R 9/06* (2006.01)

(52) U.S. Cl.
CPC ............... *H04R 9/045* (2013.01); *H04R 9/06* (2013.01); *H04R 9/063* (2013.01); *H04R 2207/021* (2013.01); *H04R 2209/027* (2013.01); *H04R 2400/11* (2013.01); *H04R 2400/13* (2013.01)

(56) References Cited

U.S. PATENT DOCUMENTS

| | | | | |
|---|---|---|---|---|
| 11,297,415 | B2 * | 4/2022 | Scheek | H04R 7/04 |
| 12,041,412 | B2 * | 7/2024 | Scheek | H04R 9/063 |
| 2008/0044044 | A1 * | 2/2008 | Madaffari | H04R 9/025 381/186 |
| 2014/0314249 | A1 * | 10/2014 | Fincham | H04R 1/403 381/89 |

* cited by examiner

LOW PROFILE LOUDSPEAKER DEVICE

CROSS-REFERENCE TO RELATED APPLICATIONS

The present application is a continuation of U.S. patent application Ser. No. 18/321,301, filed May 22, 2023, now abandoned, which is a continuation of U.S. patent application Ser. No. 17/681,914, filed Feb. 28, 2022, now U.S. Pat. No. 12,041,412, which is a division of U.S. patent application Ser. No. 16/760,049, filed Apr. 29, 2020, now U.S. Pat. No. 11,297,415, which is a 371 National Phase application of International Application No. PCT/EP2018/079509, filed Oct. 26, 2018, which claims priority to Netherlands Patent Application No. 1042617, filed Nov. 1, 2017, each of which is incorporated herein by reference in its entirety.

TECHNICAL FIELD

The present invention relates to a loudspeaker device and in particular to a low-profile loudspeaker device.

BACKGROUND

The most important development in loudspeakers is to make loudspeakers more powerful and more compact, preferably without compromising on efficiency and cost. A loudspeaker is deemed powerful if it has a relatively high maximum sound pressure level and can easily reproduce lower frequencies, for instance below 100 Hz, taking the size of the driver and housing into account.

Compact loudspeaker systems are also often low in weight. Undesirable mechanical vibrations can occur when a loudspeaker diaphragm makes high excursions in a lightweight housing. One solution is to add a second driver facing away from the existing driver, an arrangement that is sometimes known as dual, opposing driver cancellation (DODC). An advantage of DODC is that mechanical vibrations from the two drivers cancel out. A disadvantage of DODC is that the housing is at least twice as large because the two drivers are arranged back-to-back against each other; this increase in housing size is undesirable for a compact loudspeaker system.

An alternative opposed driver configuration is described in U.S. Pat. No. 9,609,405 in which a number of drivers are placed side-by-side in the same lateral plane, with a first set of drivers facing one direction and a second set of drivers facing the opposite direction so that forces from the two sets of drivers cancel out. The configuration described in U.S. Pat. No. 9,609,405 achieves a low transverse profile, or height, comparable to a single driver by arranging the sets of drivers in a lateral plane. However, the drivers must be in an 'A-B-B-A' configuration to avoid vibrations and/or moments of force when the drivers are in use. Thus, a low transverse profile is achieved at the expense of a greater lateral profile.

SUMMARY

In accordance with one aspect of the present disclosure, there is provided a loudspeaker device, comprising first and second diaphragms arranged co-axially in an opposed relation to each other, each diaphragm having a plurality of motors operatively coupled thereto, wherein the motors of the first and second diaphragms are arranged in the same plane.

The loudspeaker device may further comprise a frame having first and second ends, the first diaphragm (12) arranged near the first end of the frame and the second diaphragm arranged near the second end of the frame, the motors of the first and second diaphragms being provided on the frame.

The frame may comprise first and second rims provided at the first and second ends, respectively, wherein the first diaphragm (12) is mounted to the first rim via a first surround, and the second diaphragm is mounted to the second rim via a second surround.

In embodiments of the present disclosure, the frame may further comprise a first support member provided closer to the second end than to the first end and a second support member provided closer to the first end than to the second end, the motors of the first diaphragm (12) being provided on the first support member and the motors of the second diaphragm being provided on the second support member.

The frame may further comprise a reinforcing member extending between the first and second support members.

The frame may further comprise a plurality of struts extending between the first and second rims, the first and second support members extending between the struts.

The first and second support members may be rotationally offset from each other whereby the motors of the first and second diaphragms are arranged in an alternating manner.

Each motor may comprise a magnet and a voice coil provided on a former, the former of each motor being attached to the corresponding diaphragm. Alternatively, each motor may comprise a magnet and a voice coil formed without a former, the voice coil of each motor being attached to the corresponding diaphragm.

In other embodiments of the present disclosure, the motors may be provided on the frame around the periphery of the first and second diaphragms. The frame may further comprise a plurality of struts extending between the first and second rims, the motors being provided on the struts.

Each motor may comprise a magnet and a voice coil provided on a former, each motor being attached to the corresponding diaphragm by a bracket extending between the diaphragm and the former. Alternatively, each motor may comprise a magnet and a voice coil formed without a former, wherein each motor is attached to the corresponding diaphragm by a bracket extending between the diaphragm and the voice coil.

The motors of the first and second diaphragms may be arranged in an alternating manner.

A rear volume may be defined between the first and second diaphragms, with the first and second diaphragms sharing the rear volume.

In embodiments of the present disclosure, a maximum excursion of each diaphragm may correspond to ⅓ of the transverse profile, or height, of the loudspeaker device.

In embodiments of the present disclosure, the device may have a transverse height that corresponds with a transverse height of the motors of the first and second diaphragms. Preferably, the device has a transverse profile that is less than or equal to 1.25 times the transverse profile of a diaphragm and attached motors.

Other features and aspects of this disclosure will be apparent from the following description and the accompanying drawings.

BRIEF DESCRIPTION OF THE DRAWINGS

Embodiments of the present disclosure will now be described with reference to the accompanying drawings, in which.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1A:
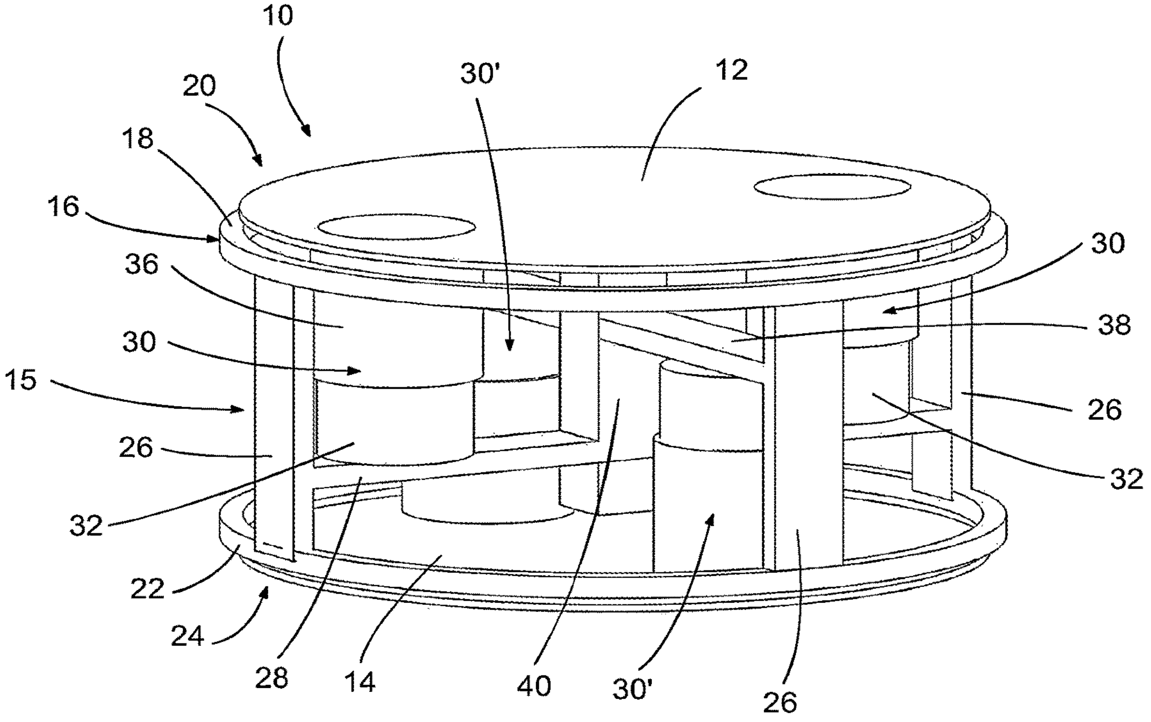
FIG. 1A is a perspective view of a loudspeaker device according to a first embodiment of the present disclosure.
Figure 1B:
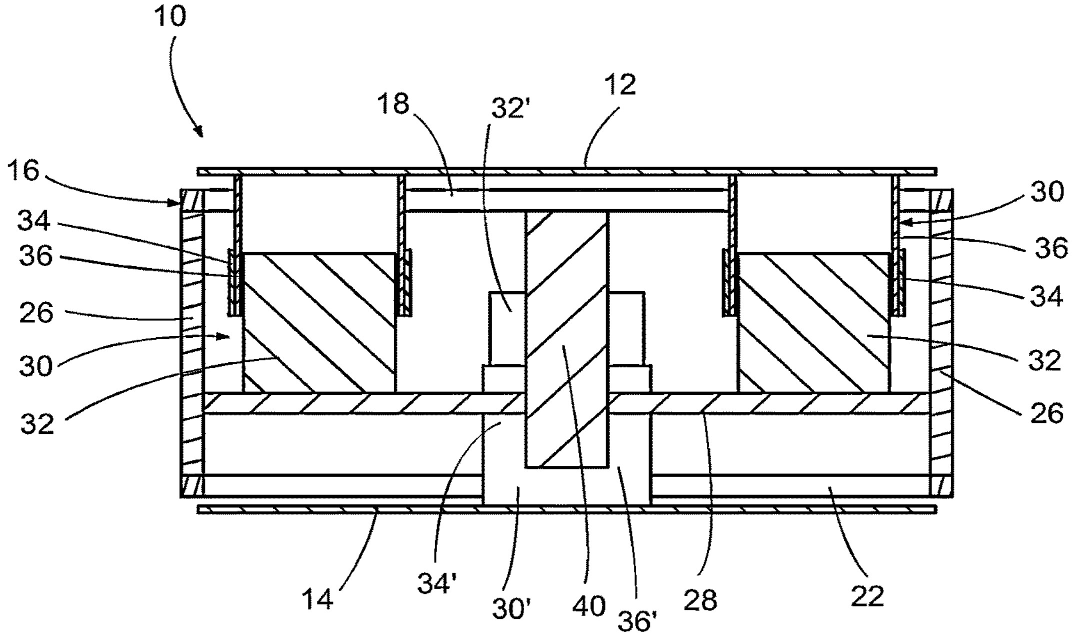
FIG. 1B is a side view in cross-section of the loudspeaker device of FIG. 1A.

Referring to FIGS. 1A and 1B, there is shown a loudspeaker device 10 according to a first embodiment of the present disclosure. The loudspeaker device 10 comprises a first diaphragm 12 and a second diaphragm 14 arranged co-axially in an opposed relation to each other. The diaphragms 12, 14 of the embodiment have a flat, circular configuration. While other configurations of diaphragms may be used in embodiments of the present disclosure a flat configuration is preferred to reduce the profile of the loudspeaker device 10. A rear volume 15 is defined between the first and second diaphragms 12, 14, whereby the first and second diaphragms share the rear volume 15.

The loudspeaker device 10 further comprises a frame 16 having a first rim 18 provided at a first end 20 and a second rim 22 provided at a second end 24 of the frame 16. The first and second rims 18, 22 are circular to match the configuration of the diaphragms 12, 14. The first diaphragm 12 is provided near the first end 20 of the frame 16 and the second diaphragm 14 is provided near the second end 24 of the frame 16. Although not shown in FIGS. 1A and 1B, the first diaphragm 12 may be mounted to the first rim 18 via a first surround (not shown) and the second diaphragm 14 may be mounted to the second rim 22 via a second surround (not shown).

A plurality of struts 26 extend between the first and second rims 18, 22. Four struts 26 are shown in FIGS. 1A and 1B provided equally spaced around the perimeter of the first and second rims 18, 22, however more struts may be used in other embodiments.

The frame 16 further comprises a first support member 28 that extends laterally between two of the struts 26 located on opposite sides of the rims 18, 22. The first support member 28 is provided closer to the second end 24 than to the first end 20 such that the first support member 28 is spaced from the first diaphragm 12.

The first diaphragm 12 has a plurality of motors 30 operatively coupled thereto. The motors 30 are provided on the frame 16. In the embodiment shown in FIGS. 1A and 1B, there are two motors 30 which are provided on the first support member 28 in a spaced apart manner. Each motor 30 comprises a magnet 32 that is attached to the first support member 28, and a voice coil 34 provided on a former 36. The former 36 of each motor 30 is attached to the first diaphragm 12.

The frame 16 further comprises a second support member 38 that extends laterally between another two of the struts 26 that are on opposite sides of the rims 18, 22. The second support member 38 is provided closer to the first end 20 than to the second end 24 such that the second support member 38 is spaced from the second diaphragm 14.

The second diaphragm 14 has a plurality of motors 30' operatively coupled thereto. The motors 30' are also provided on the frame 16. In the embodiment shown in FIGS. 1A and 1B, there are two motors 30' which are provided on the second support member 38 in a spaced apart manner. Each motor 30' comprises a magnet 32' that is attached to the second support member 38, and a voice coil 34' provided on a former 36'. The former 36' of each motor 30' is attached to the second diaphragm 14. In alternative embodiments of the present disclosure the voice coils may be formed without a former, also known as formerless voice coils or air coils, in which case the voice coils would be directly attached to the diaphragms 12, 14. The formerless voice coils may be made in any suitable manner known to those in the art, example of which include forming the voice coil from a coated wire and then baking the voice coil so the coating on adjacent wires in the voice coil meld together, using an adhesive coating on the wire used to form the voice coil, or using a separate adhesive. In another alternative embodiment, the coils—via a former or directly—are physically connected to the membrane. Namely, there is a direct physical drive of a coil that pushes (via a former or other construction) against the membrane. Thus, the membrane is then driven by air pressure and by a tangible object, i.e. the coil, that pushes against the membrane.

The voice coils 34, 34' of the motors 30, 30' may be wound in series or parallel, or a combination thereof where more than two motors are provided for each diaphragm. The magnets 32, 32' of the motors 30, 30' may be of any suitable type known to the skilled person; however rare-earth magnets such as neodymium magnets are preferred for their high magnetic flux density.

The first and second support members 28, 38 are spaced apart in a transverse direction since the first support member 28 is closer to the second end 24 while the second support member 38 is closer to the first end 20. The first and second support members 28, 38 are rotationally offset from each other. In the embodiment shown in FIGS. 1A and 1B, the first and second support members 28, 38 are rotated by 90 degrees from each other such that the motors 30, 30' are arranged in an alternating manner. This configuration results in the motors 30, 30' of the first and second diaphragms 12, 14 being arranged in the same lateral plane, reducing the transverse profile, or height, of the loudspeaker device 16. For example, a loudspeaker system using the loudspeaker device 10 shown in FIGS. 1A and 1B may have a transverse profile that is 1.25 times the profile of a single-driver system, compared with prior art opposed driver system which have a transverse profile that is twice the profile of a single-driver system. Further, loudspeaker device 10 does not increase the lateral profile compared to a single-driver system since the diaphragms are coaxially aligned. Still further, mechanical vibrations from movement of the diaphragms 12, 14 in use are cancelled due to the opposed configuration of the diaphragms.

The frame 16 may further comprise a reinforcing member 40 extending between the first and second support members 28, 38. The reinforcing member 40 may extend between the mid-points of the first and second support members 28, 38. In other embodiments of the present disclosure, the frame may be formed integrally with all or part of a larger structure such as a housing for the loudspeaker device.

Using multiple separate motors 30, 30' for the diaphragms 12, 14 may increase the efficiency with which the diaphragm is moved, making it possible to reproduce lower frequencies in a small closed cabinet. Further, attaching multiple motors to each diaphragm may increase linearity and diaphragm rigidity, which are important for high excursion drivers typically used in low frequency reproduction loudspeaker systems.

Figure 2A:
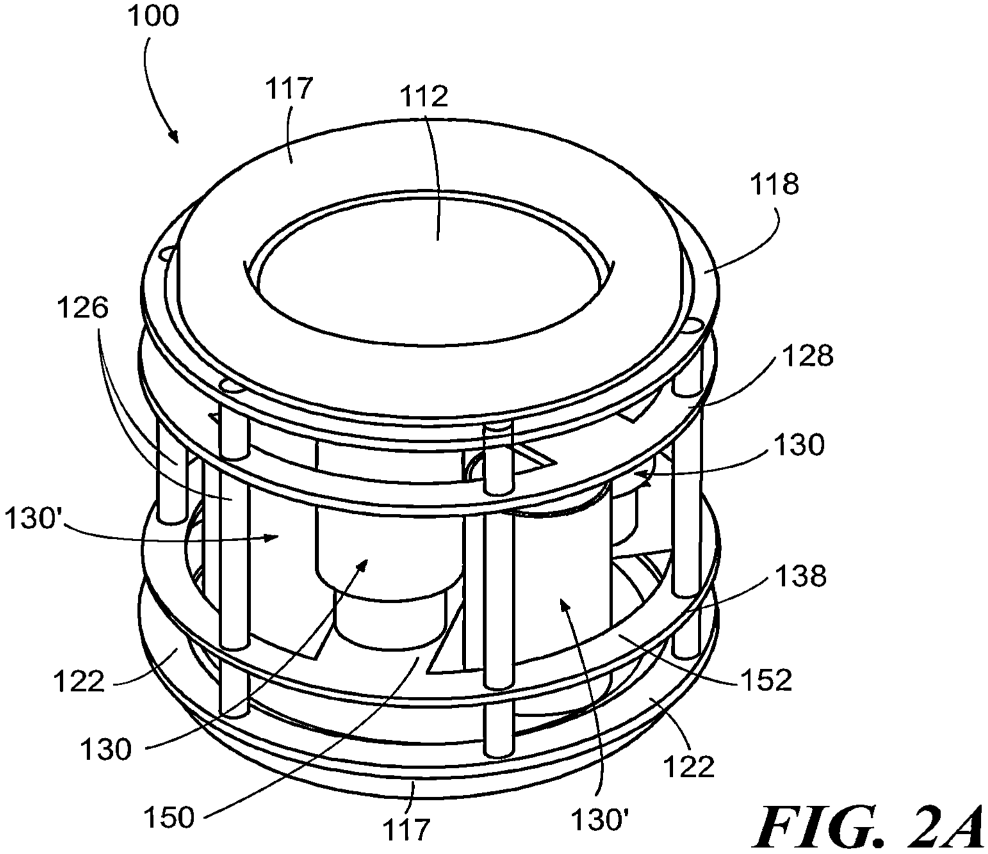
FIG. 2A is a perspective view of a loudspeaker device according to a second embodiment of the present disclosure.
Figure 2B:
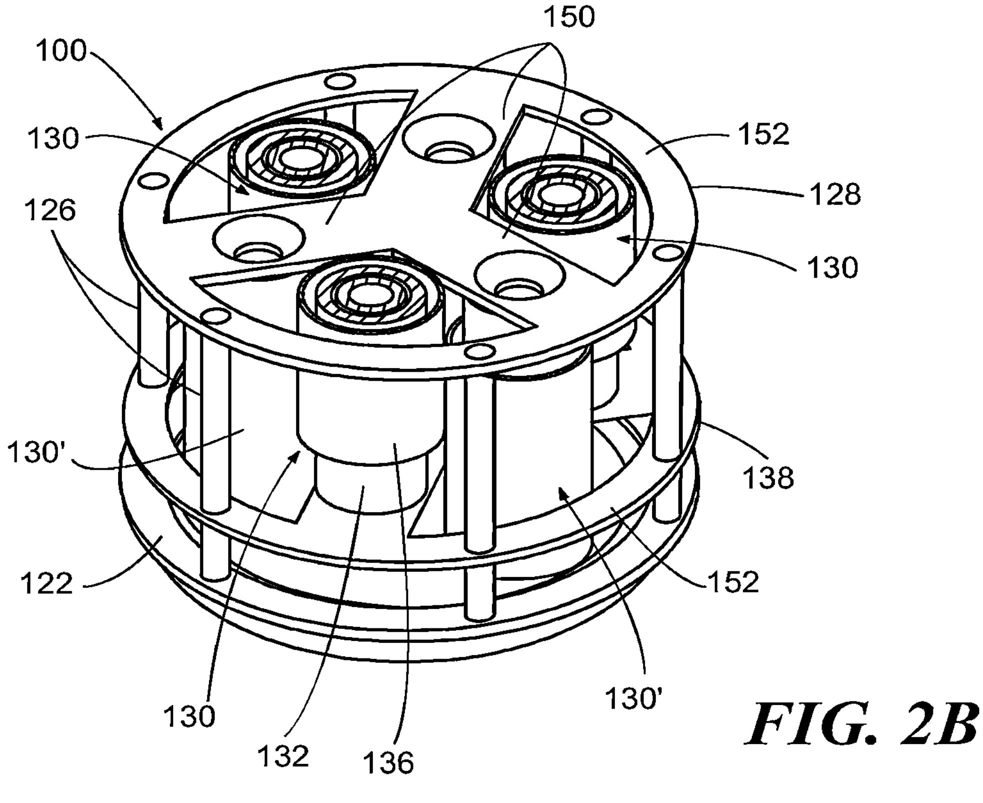
FIG. 2B shows the perspective view of the loudspeaker device of FIG. 2A in lateral cross-section.
Figure 2C:
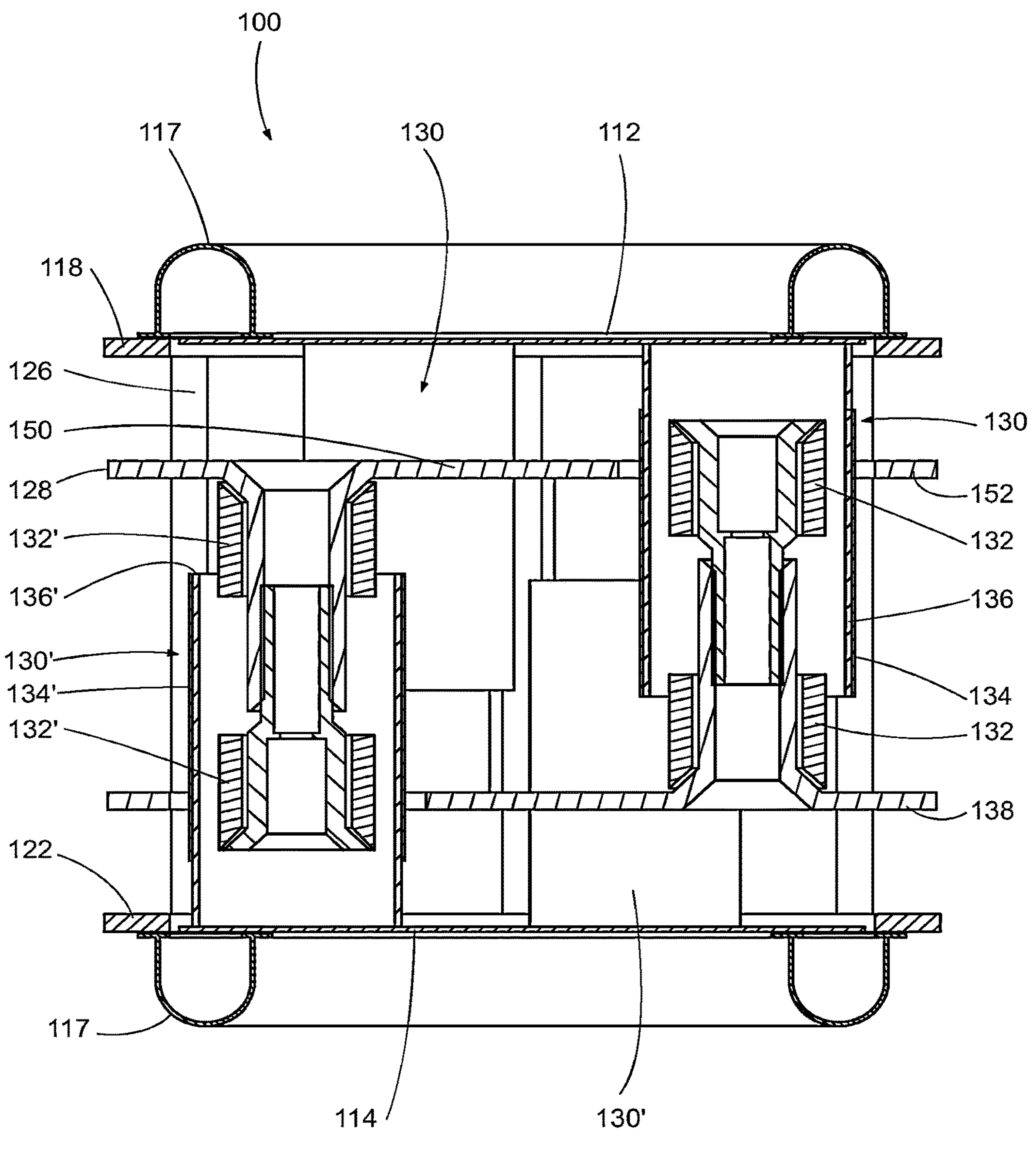
FIG. 2C is a side view in cross-section of the loudspeaker device of FIG. 2A.

Referring now to FIGS. 2A-2C, there is shown a loudspeaker device 100 according to a second embodiment of the present disclosure. The loudspeaker device 100 is of the same general form as the loudspeaker device 10 and like reference numerals are used to denote like parts with 100 added thereto.

The first diaphragm 112 of the loudspeaker device 100 is mounted to the first rim 118 via a first surround 117. The second diaphragm 114 of the loudspeaker device 100 is mounted to the second rim 122 via a second surround 117'.

The loudspeaker device 100 differs from the loudspeaker device 10 in that each diaphragm 112, 114 of the loudspeaker device 100 has three motors 130, 130', respectively.

As shown in FIG. 2B, the support members 128, 138 each comprise three arms 150 spaced 120 degrees apart from each other and connected to an outer support rim 152. One motor 130, 130' is mounted on each arm 150 such that the six motors 130, 130' of the first and second diaphragms 112, 114 are arranged in an alternating manner around the same lateral plane.

The motors 130, 130' shown in FIG. 2A-2C are longer than the motors 30, 30' shown in FIG. 1A-1B, to permit greater excursion of the diaphragms 112, 114 and further improve low frequency reproduction of the loudspeaker device 100. Suitable motor configurations known to those skilled in the art to provide longer excursion may be used such as longer magnets or multiple magnets, longer voice coils, or voice coils with multiple windings. The arrangement of the motors 130, 130' in the same lateral plane permits a maximum excursion of each diaphragm corresponding to ⅓ of the transverse profile, or height, of the loudspeaker device.

Figure 3A:
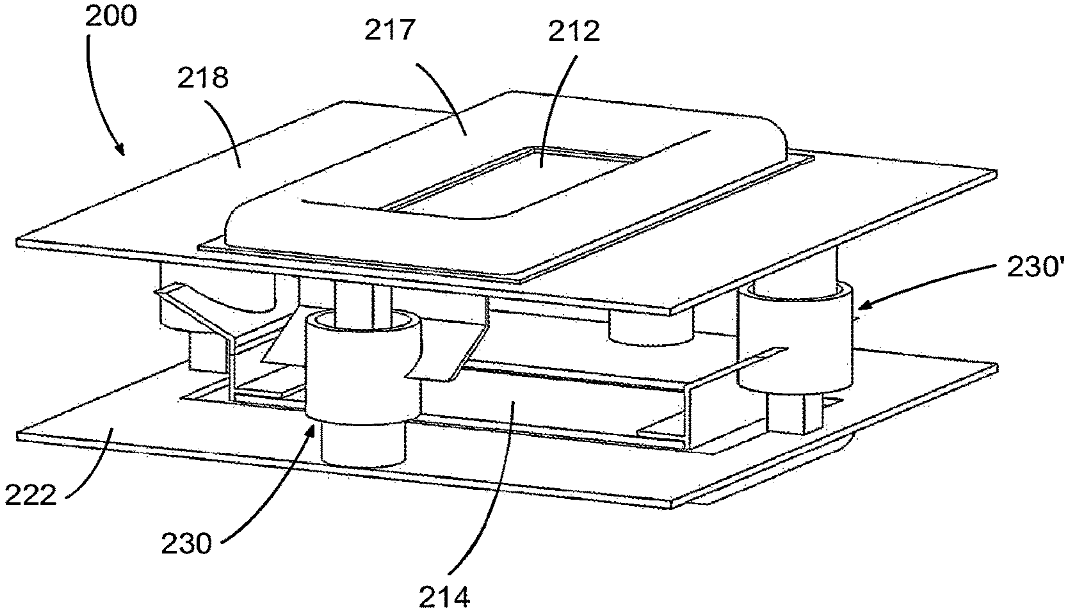
FIG. 3A is a perspective view of a loudspeaker device according to a third embodiment of the present disclosure.
Figure 3B:
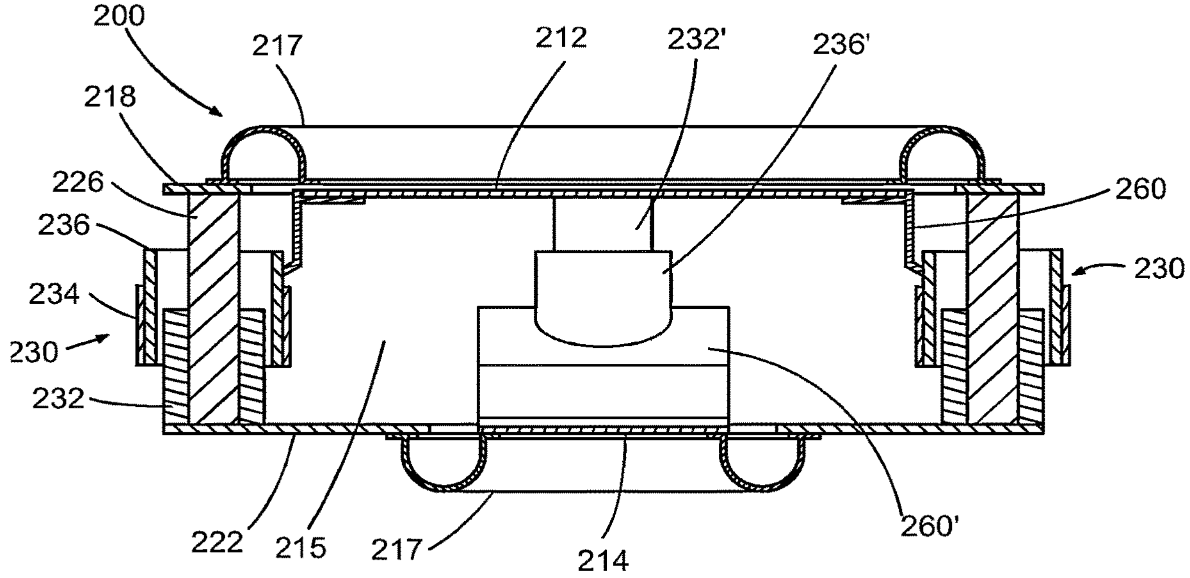
FIG. 3B is a side view in cross-section of the loudspeaker device of FIG. 3A.

Referring now to FIGS. 3A-3B, there is shown a loudspeaker device 200 according to a third embodiment of the present disclosure. Like reference numerals are used to denote like parts to those shown in FIGS. 2A-2C, with 100 added thereto.

The diaphragms 212, 214 of the loudspeaker device 200 are rectangular in shape. The diaphragm 214 is rotated by 90 degrees in a lateral plane relative to the diaphragm 212 such that the diaphragms form a cross or "+" as seen in FIG. 3A. Such an arrangement may increase the available space in the between the diaphragms. In other embodiments, the diaphragms 212, 214 may be formed in other shapes and may be aligned with each other or may be rotated by other angles in the lateral plane.

The frame 216 of the loudspeaker device 200 differs from the frame 116 shown in FIGS. 2A-2C in that the frame 216 omits the support members. Further, the first and second rims 218, 222 of the frame 216 are rectangular, and may be square as shown in FIG. 3A, extending laterally beyond the diaphragm to act as a mounting plate.

The motors 230, 230' of the loudspeaker device 200 are provided around the periphery of the first and second diaphragms 218, 222, in contrast to earlier embodiments in which the motors were provided beneath the diaphragms. The motors 230, 230' are provided on the struts 226 that extend between the first and second rims 218, 222 rather than being provided on support members as in previous embodiments. Arranging the motors 230, 230' around the periphery of the diaphragms may further reduce the transverse profile of the loudspeaker device.

Situating the motors 230, 230' around the periphery of the diaphragms 212, 214, instead of underneath the diaphragms, allows the diaphragms 212, 214 to be positioned closer to each other since there are no objects (i.e. voice coils, suspensions, magnets, mounting plates etc.) to collide or intersect with the diaphragm as it moves in use. Providing the motors beneath the diaphragms, as described in the preceding embodiments, leads to the transverse profile of the loudspeaker device being ultimately limited by the size of the motors and the requirement for free space between the motors and the diaphragms to allow for the excursion of the diaphragm in use (so the diaphragms do not collide with the motors). In the loudspeaker device 200, the motors 230, 230' are provided at the periphery from the diaphragms 212, 214 and may be spaced from the periphery in some embodiments. Thus, there is no requirement for free space in a transverse direction between the motors 230, 230' and the diaphragms 212, 214 to allow for the excursion of the diaphragm in use since the diaphragms will not collide with the motors. The result is the transverse profile of the loudspeaker device 200 is limited by the size of the motors and may result in a transverse profile that corresponds with a single-driver loudspeaker system.

The former 236, 236' of each motor 230, 230' is attached to the corresponding diaphragm 212, 214 via a bracket 260, 260', respectively, that extends between the diaphragm 212, 214 and the former 236, 236'.

Figure 4A:
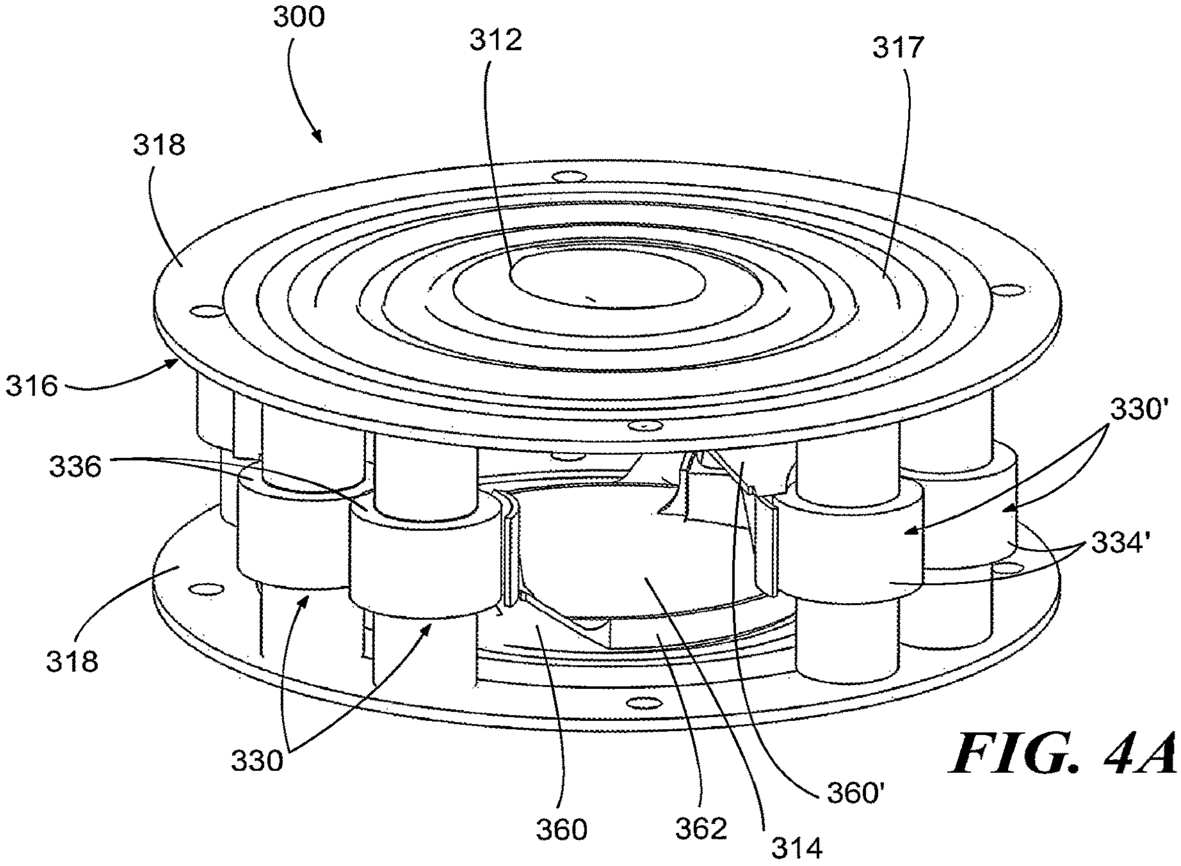
FIG. 4A is a perspective view of a loudspeaker device according to a fourth embodiment of the present disclosure.
Figure 4B:
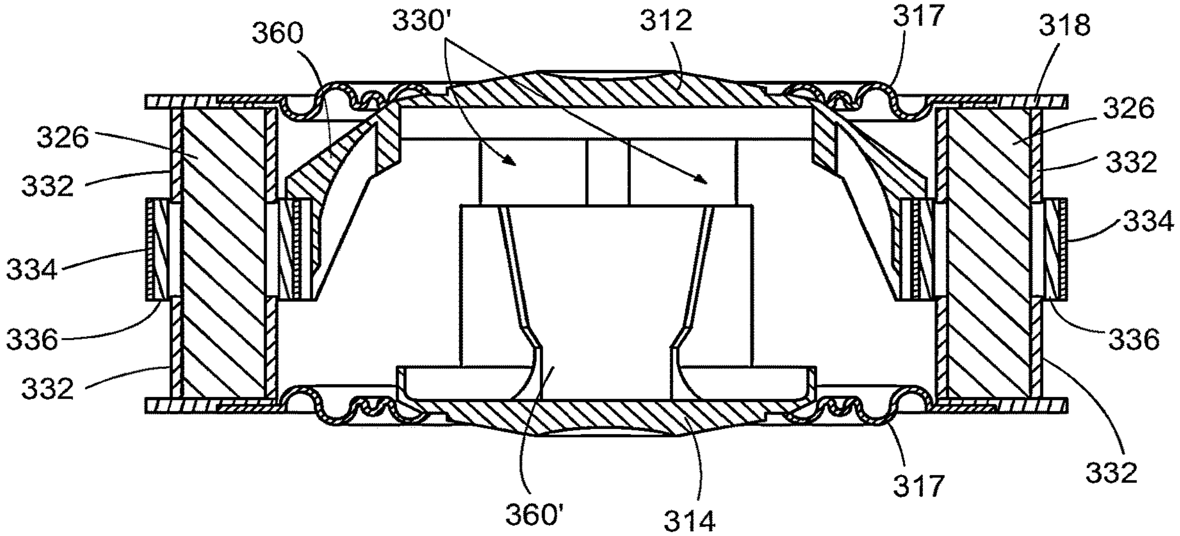
FIG. 4B is a side view in cross-section of the loudspeaker device of FIG. 4A.

Referring now to FIGS. 4A-4B, there is shown a loudspeaker device 300 according to a fourth embodiment of the present disclosure. The loudspeaker device 300 is of the same general form as the loudspeaker device 200 and like reference numerals are used to denote like parts with 100 added thereto.

The brackets 360, 360' of the loudspeaker device 300 are formed integral with a collar 362, 362' which are attached to the diaphragms 312, 314, respectively. In the embodiment illustrated in FIGS. 4A-4B, the brackets 360, 360' are formed integrally with the diaphragms 312, 314.

The motors 330, 330' of the loudspeaker device 300 are arranged in pairs, with the formers 336 of each pair of motors 330, 330' being connected to one of the brackets 360, 360'. The pairs of motors 330, 330' are arranged in an alternating manner around the frame 316. As shown in FIG. 3A-3B there are two pairs of motors 330, 330' for each diaphragm 312, 314, respectively. Arranging the motors 330, 330' in pairs which shares a common bracket 360, 360' may increase the efficiency with which the diaphragms 312, 314 are moved and may also reduce the mass of the brackets 360, 360' compared to arrangements where the four motors of each diaphragm are equally spared around the diaphragm and thus required four brackets.

The loudspeaker device 300, as shown in FIG. 3A-3B, uses motors 330, 330' with multiple magnets 332, 332'. Each motor 330, 330' comprises two magnets 332, 332' arranged to increase the excursion of the voice coils 334, 334' and thus the diaphragms 312, 314.

While aspects of the present disclosure have been particularly shown and described with reference to the embodiments above, it will be understood by those skilled in the art that various additional embodiments may be contemplated by the modification of the disclosed devices without departing from the scope of the present disclosure as set forth in the claims.

The invention claimed is:

1. A loudspeaker device, comprising:

first and second diaphragms arranged co-axially in an opposed relation to each other, the first diaphragm having a first plurality of motors (i) operatively coupled thereto and (ii) configured to drive only the first diaphragm, the second diaphragm having a second plurality of motors (i) operatively coupled thereto and (ii) configured to drive only the second diaphragm, wherein the first and second plurality of motors are arranged in an alternating manner around a periphery of the first and second diaphragms, wherein a plurality of struts extend between a first rim coupled to the first diaphragm and a second rim coupled to the second diaphragm, and wherein the motors are provided on the struts.

2. The loudspeaker device of claim 1, further comprising a frame having first and second ends, the first diaphragm arranged near the first end of the frame and the second diaphragm arranged near the second end of the frame, the first and second plurality of motors of the first and second diaphragms being provided on the frame.

3. The loudspeaker device of claim 2, wherein the first diaphragm is mounted to the first rim via a first surround, and the second diaphragm is mounted to the second rim via a second surround.

4. The loudspeaker device of claim 2, wherein the frame further comprises a first support member provided closer to the second end than to the first end and a second support member provided closer to the first end than to the second end, the first plurality of motors of the first diaphragm being provided on the first support member and the second plurality of motors of the second diaphragm being provided on the second support member.

5. The loudspeaker device of claim 4, wherein the frame further comprises a reinforcing member extending between the first and second support members.

6. The loudspeaker device of claim 4, wherein the first and second support members are rotationally offset from each other whereby the motors of the first and second diaphragms are arranged in the alternating manner around the periphery of the first and second diaphragms.

7. The loudspeaker device of claim 1, wherein the motors are provided on a frame around the periphery of the first and second diaphragms.

8. The loudspeaker device of claim 1, wherein each motor comprises a magnet and a voice coil.

9. The loudspeaker device of claim 8, wherein each voice coil is provided on a former.

10. The loudspeaker device of claim 9, wherein the former of each motor is attached to the corresponding diaphragm.

11. The loudspeaker device of claim 10, wherein the former of each motor is attached to the corresponding diaphragm by a bracket extending between the diaphragm and the former.

12. The loudspeaker device of claim 8, wherein each motor is formed without a former.

13. The device of claim 12, wherein the voice coil of each motor is attached to the corresponding diaphragm.

* * * * *